United States Patent
Tomita et al.

(10) Patent No.: US 7,117,666 B2
(45) Date of Patent: Oct. 10, 2006

(54) DIRECT FUEL INJECTION/SPARK IGNITION ENGINE CONTROL DEVICE

(75) Inventors: Masayuki Tomita, Yokohama (JP); Tsutomu Kikuchi, Setagaya-ku (JP); Yuichi Iriya, Yokohama (JP); Hitoshi Ishii, Yokosuka (JP); Mitsuhiro Akagi, Yokohama (JP); Katsuaki Uchiyama, Yokohama (JP); Masahiko Yuya, Yokohama (JP); Takao Maitani, Isehara (JP); Masahiro Fukuzumi, Machida (JP)

(73) Assignee: Nissan Motor Co., Ltd., Yokohama (JP)

( * ) Notice: Subject to any disclaimer, the term of this patent is extended or adjusted under 35 U.S.C. 154(b) by 13 days.

(21) Appl. No.: 10/960,692

(22) Filed: Oct. 8, 2004

(65) Prior Publication Data

US 2005/0081511 A1 Apr. 21, 2005

(30) Foreign Application Priority Data

Oct. 17, 2003 (JP) ............................. 2003-357751

(51) Int. Cl.
*F01N 3/00* (2006.01)

(52) U.S. Cl. ............................. 60/285; 60/282; 60/287; 60/295

(58) Field of Classification Search .................. 60/272, 60/282, 285, 287, 295
See application file for complete search history.

(56) References Cited

U.S. PATENT DOCUMENTS 4,955,339 A * 9/1990 Sasaki et al. ............... 123/295

5,775,099 A * 7/1998 Ito et al. ...................... 60/274
6,044,642 A * 4/2000 Nishimura et al. ........... 60/285
6,116,208 A * 9/2000 Nishimura et al. ......... 123/295
6,173,570 B1 * 1/2001 Mitsumoto et al. ........... 60/285
6,240,724 B1 * 6/2001 Kudou et al. ................. 60/284
6,318,074 B1 * 11/2001 Nishimura et al. ........... 60/284
6,330,796 B1 * 12/2001 Nishimura et al. ........... 60/286
6,345,499 B1 * 2/2002 Nishimura et al. ........... 60/277
6,434,929 B1 * 8/2002 Nishimura et al. ........... 60/278
6,438,943 B1 * 8/2002 Yamamoto et al. .......... 60/274
6,561,158 B1 * 5/2003 Yoshida et al. ............. 123/295
6,637,192 B1 * 10/2003 Yamamoto et al. .......... 60/274
6,725,649 B1 * 4/2004 Yamashita et al. ........... 60/284

FOREIGN PATENT DOCUMENTS

JP 10-212987 A 8/1998
JP 2000-145510 A 5/2000

* cited by examiner

*Primary Examiner*—Thomas Denion
*Assistant Examiner*—Loren Edwards
(74) *Attorney, Agent, or Firm*—Global IP Counselors, LLP

(57) ABSTRACT

An engine control device is configured to cause an engine to operate at the optimum combustion mode according to the load when warming up of an emissions purification catalyst is required, and to obtain reduced HC discharged from the engine and accelerated warm-up of the catalyst. The engine control device performs stratified combustion with a compression stroke injection in a low-load region according to the engine load, and performs double-injection combustion with an intake stroke injection and a compression stroke injection in an intermediate load region, when warming up of the catalyst is required. In a high-load region, the engine control device performs homogenous combustion with an intake stroke injection.

17 Claims, 8 Drawing Sheets

DIRECT FUEL INJECTION/SPARK IGNITION ENGINE CONTROL DEVICE

BACKGROUND OF THE INVENTION

1. Field of the Invention

The present invention generally relates to a control device for a direct fuel injection spark ignition engine. More specifically, the present invention relates to a control device that is suitable during cold starting and the like, or when it is necessary to warm up a catalyst for exhaust purification provided to the exhaust channel.

2. Background Information

One example of a direct fuel injection spark ignition engine is disclosed in Japanese Laid-Open Patent Application No. 10-212987 in which emissions are significantly improved by reducing the amount of HC, NOx, and other exhaust from the engine during a cold start and accelerating warm-up. Accordingly, in this direct fuel injection spark ignition engine, an air mixture with the theoretical air/fuel ratio or a richer air/fuel ratio is formed in the area of the combustion chamber near the spark plug, and a mixture that is leaner than the theoretical air/fuel ratio is formed at the periphery of the combustion chamber by performing split injection between intake stroke injection and compression stroke injection.

Another example of a direct fuel injection spark ignition engine is disclosed in Japanese Laid-Open Patent Application No. 2000-145510. In this direct fuel injection spark ignition engine, a three-way catalyst is not activated during a cold start and HC is discharged without being reduced in the case of homogenous combustion with an intake stroke injection. Thus, in this direct fuel injection spark ignition engine, when the temperature of the engine is detected and the detected temperature is below a prescribed temperature, the air/fuel ratio is adjusted to be leaner than the theoretical air/fuel ratio in the compression stroke, and the fuel is injected.

In view of the above, it will be apparent to those skilled in the art from this disclosure that there exists a need for an improved control device. This invention addresses this need in the art as well as other needs, which will become apparent to those skilled in the art from this disclosure.

SUMMARY OF THE INVENTION

It has been discovered that the amount of HC discharge is less than in the case of homogenous combustion when double-injection combustion is performed with an intake stroke injection and a compression stroke injection during low load when warming up of the catalyst is not required, as disclosed in Japanese Laid-Open Patent Application No. 10-212987. However, there is still the drawback with this type of combustion control in that the amount of HC discharge increases in comparison with stratified combustion.

The amount of HC discharge can be reduced when stratified combustion with a compression stroke injection is performed during low load when warming up of the catalyst is required as disclosed in Japanese Laid-Open Patent Application No. 2000-145510. However, a drawback still exists in that the combustion stability declines as the load increases, so the range in which stratified combustion can be performed is limited.

In view of the foregoing drawbacks, one object of the present invention is to perform optimal combustion control according to the load condition when warming up of the catalyst is not required.

In view of the forgoing, a direct fuel injection/spark ignition engine control device apparatus is provided that basically comprises an engine load determination section, a catalyst condition determination section and a combustion control section. The engine load determination section is configured to determine an engine load of a direct fuel injection engine. The catalyst condition determination section is configured to determine a state of a catalyst for exhaust purification disposed in an exhaust passage of the direct fuel injection engine. The combustion control section is configured to control a combustion mode based on the engine load as determined by the engine load determination section and the state of the catalyst as determined by the catalyst condition determination section such that a stratified combustion mode is performed when the engine load is a prescribed low load region and when warming up of the catalyst is required, and such that a double-injection combustion mode is performed with an intake stroke injection and a compression stroke injection when the engine load is higher load than the prescribed low load region.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
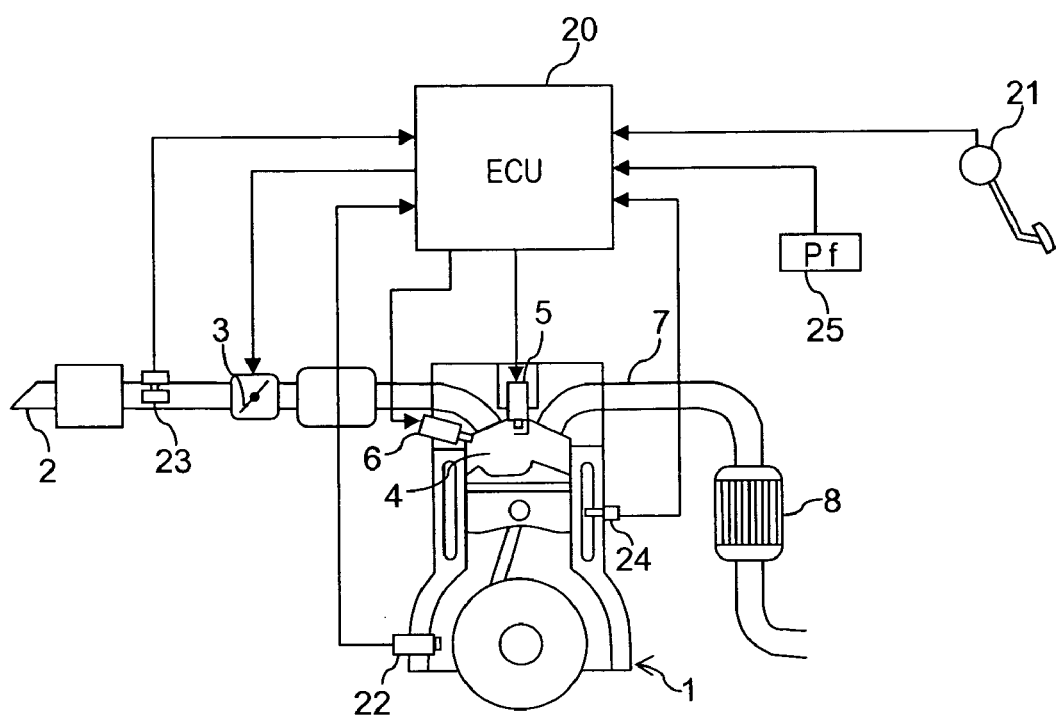
FIG. 1 is a diagrammatic view of an engine system illustrating a direct fuel injection/spark ignition engine control device for an internal combustion engine in accordance with a first embodiment of the present invention.

Referring initially to FIG. 1, a direct fuel injection/spark ignition engine 1 is diagrammatically illustrated that is equipped with a direct fuel injection/spark ignition engine control device in accordance with a first embodiment of the present invention. The engine 1 has an intake passage 2 with an electronically controlled throttle valve 3 mounted therein. The electronically controlled throttle valve 3 is configured and arranged for controlling the intake air quantity to the intake passage 2 of the engine 1. The intake passage 2 is fluidly connected to a plurality of combustion chambers 4 (only one shown) of the engine 1. Each combustion chamber 4 includes a spark plug 5 and a fuel injection valve 6. The spark plug 5 and the fuel injection valve 6 are mounted to the combustion chamber 4 in a conventional manner. The engine 1 also has an exhaust passage 7 fluidly connected to each combustion chamber 4. The exhaust passage 7 includes a catalytic converter 8 with a catalyst for exhaust purification in a conventional manner.

The engine is controlled by an engine control unit or ECU 20 to perform the controlled combustion of the fuel air mixture as discussed below. The engine control unit 20 is a microcomputer comprising of a central processing unit (CPU) and other peripheral devices. The engine control unit 20 can also include other conventional components such as an input interface circuit, an output interface circuit, and storage devices such as a ROM (Read Only Memory) device and a RAM (Random Access Memory) device. The engine control unit 20 preferably includes an engine control program that controls various components as discussed below. The engine control unit 20 receives input signals from various sensors (described below) that serve to detect the operating state of the engine 1 and executes the engine controls based on these signals. It will be apparent to those skilled in the art from this disclosure that the precise structure and algorithms for the engine control unit 20 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The opening of the electronically controlled throttle valve 3 is controlled by a stepping motor or other device operated by the signal from the engine control unit 20.

The fuel injection valve 6 is configured so as to be opened by a solenoid energized by an injection pulse signal outputted from the engine control unit 20 in synchronization with the engine speed during an intake stroke or a compression stroke, and fuel that is pressurized at a prescribed pressure is injected. Thus, the fuel injected is distributed throughout the combustion chamber 4 such that a homogenous air/fuel mixture is formed in the case of an intake stroke injection, a stratified air/fuel mixture is formed around the spark plug 5 in the case of a compression stroke injection. The air/fuel mixture is ignited by the spark plug 5 based on an ignition signal from the engine control unit 20, and is burned (homogenous combustion mode, stratified combustion mode or double-injection combustion mode).

In the present invention, as explained below, the direct fuel injection timing and the ignition timing are adjusted by the engine control unit 20 to change a combustion mode based the engine load and the state of the catalyst. In particular, the combustion control is configured so as to perform stratified combustion with a compression stroke injection during a low engine load when warming up of the catalyst is required, and to perform double-injection combustion with an intake stroke injection and a compression stroke injection when the engine load is high. Thus, the amount of HC discharge can be reduced by causing stratified combustion to be performed during low load, and by causing double-injection combustion to be performed when the load is high. While the amount of HC discharge during double-injection combustion is larger than during stratified combustion, the amount of HC discharge during double-injection combustion can be made smaller than during homogenous combustion while maintaining combustion stability.

The engine control unit 20 receives input signals from the following sensors: an accelerator pedal sensor 21, a clutch angle sensor 22, an airflow meter 23, an engine coolant temperature sensor 24, and a fuel pressure sensor 25. The engine control unit 20 executes the engine controls including, but not limited to, the intake air quantity Qa, the ignition timing, the fuel injection quantity and fuel injection timing based on these signals.

The accelerator opening APO is detected by the accelerator pedal sensor 21, which outputs a signal to the engine control unit 20 that is indicative of the depression amount of the accelerator pedal. The engine speed Ne is detected by the clutch angle sensor 22, which outputs a signal to the engine control unit 20 that is indicative of the engine speed Ne. The intake air quantity Qa is detected by the airflow meter 23, which outputs a signal to the engine control unit 20 that is indicative of the intake air quantity Qa. The engine coolant temperature or water temperature Tw is detected by the engine coolant temperature sensor 24, which outputs a signal to the engine control unit 20 that is indicative of the engine coolant temperature Tw. The fuel pressure Pf of the fuel fed to the fuel injection valve 6 is detected by the fuel pressure sensor 25, which outputs a signal to the engine control unit 20 that is indicative of the fuel pressure Pf of the fuel fed to the fuel injection valve 6. The outside air temperature (intake air temperature) Tatm is detected by the outside air temperature sensor 27 which outputs a signal to the engine control unit 20 that is indicative of the intake air temperature Tatm.

The engine control unit 20 is configured to perform a selected combustion mode (homogenous combustion, stratified combustion) based on the engine operating conditions detected by these input signals, and control the opening of the electronically controlled throttle valve 3, the fuel injection timing and fuel injection quantity of the fuel injection valve 6, and the ignition timing of the spark plug 5 accordingly. Also, under normal operating conditions (after warming-up is completed), extremely lean stratified combustion is performed with an A/F ratio of about 30 to 40 (stratified lean combustion). Homogenous lean combustion (A/F=20 to 30) and homogenous stoichiometric combustion are included in homogenous combustion.

The present invention entails performing optimum combustion control according to load conditions when warming up is required for the catalyst in the catalytic converter 8, which includes cold starting. This type of control is performed by the engine control unit 20 as control from startup to during warm-up in accordance with the flowchart in FIG. 2.

Figure 2:
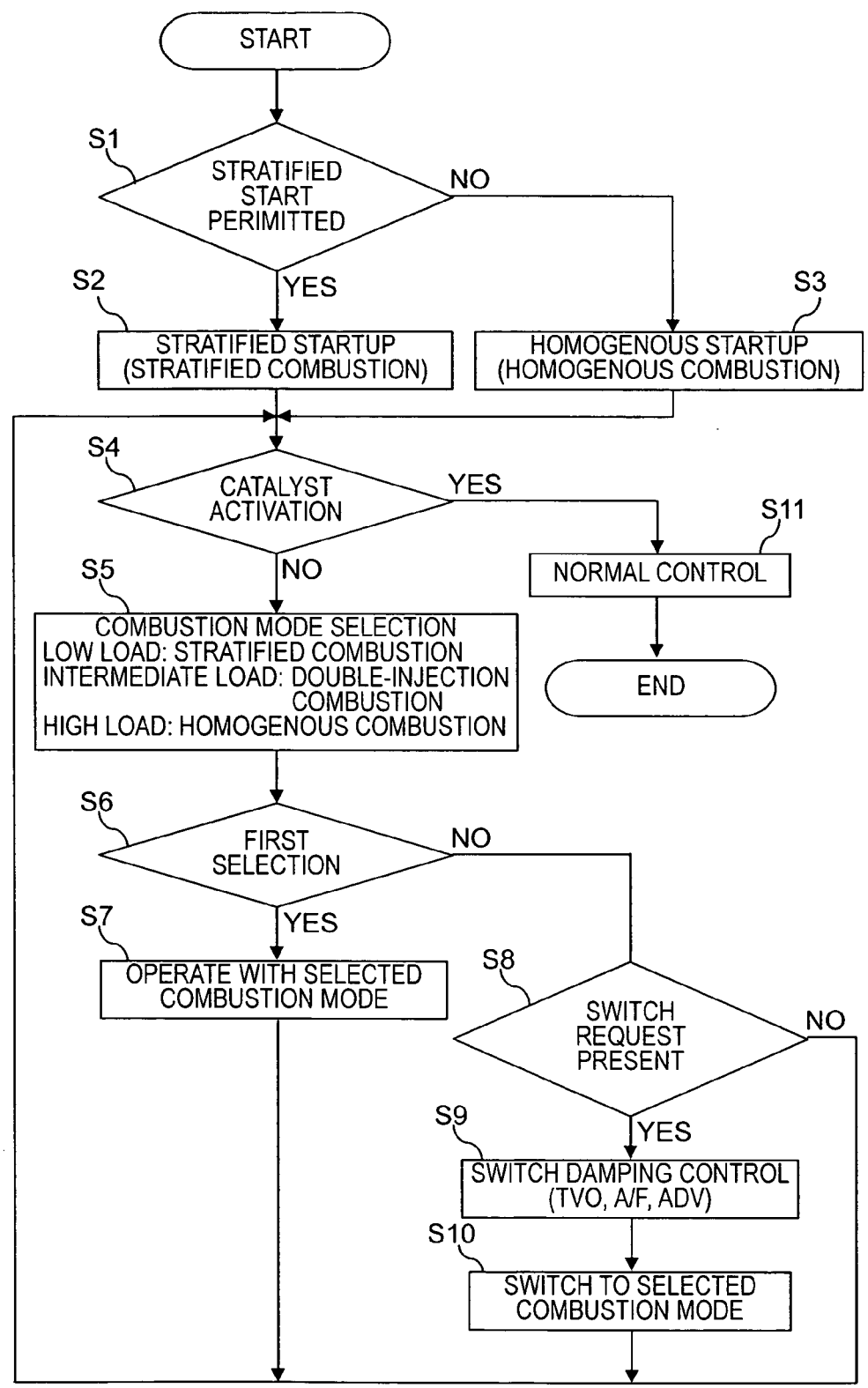
FIG. 2 is a flowchart showing the control operations executed from startup to during warm-up by the control unit of the direct fuel injection/spark ignition engine control device in accordance with the first embodiment of the present invention.

The flowchart of control from startup to during warm-up in FIG. 2 will be described.

The engine control unit 20 determines in step S1 whether to permit stratified startup (startup by stratified combustion) at the time of startup. Specifically, stratified startup is permitted on condition that the coolant temperature Tw at startup is at or above a prescribed value (−10° C., for example), and the fuel pressure Pf has risen to a level at which compression stroke injection is possible.

When the conditions for permitting stratified startup are met, the processing proceeds to step S2, and stratified startup is performed. Specifically, startup is performed by stratified combustion with a compression stroke injection.

When the conditions for permitting stratified startup are not met, the processing proceeds to step S3, and homogenous startup is performed. Specifically, startup is performed by homogenous combustion with an intake stroke injection.

The processing proceeds to step S4 after startup. In step S4, the engine control unit 20 determines whether the catalyst in the catalytic converter 8 is activated. The processing executed in step S4 constitutes a catalyst condition determination section that is configured to determine an activation state of the catalyst for exhaust purification disposed in the exhaust passage 7 of the direct fuel injection engine 1.

Specifically, in step S4, the catalyst temperature is detected when there is a catalyst temperature sensor present. When there is no catalyst temperature sensor, the catalyst temperature is estimated from the coolant temperature Tw. Alternatively, the catalyst temperature is estimated based on the coolant temperature at startup and the integrated value of the intake air quantity after startup. It is then determined whether the detected or estimated catalyst temperature is at or above a prescribed activity temperature.

When the catalyst is activated, the processing proceeds to step S11 and changes over to normal control, and control during warm-up is concluded. The aforementioned stratified lean combustion, homogenous lean combustion, homogenous stoichiometric combustion, and the like are performed according to operating conditions in normal control.

Figure 3:
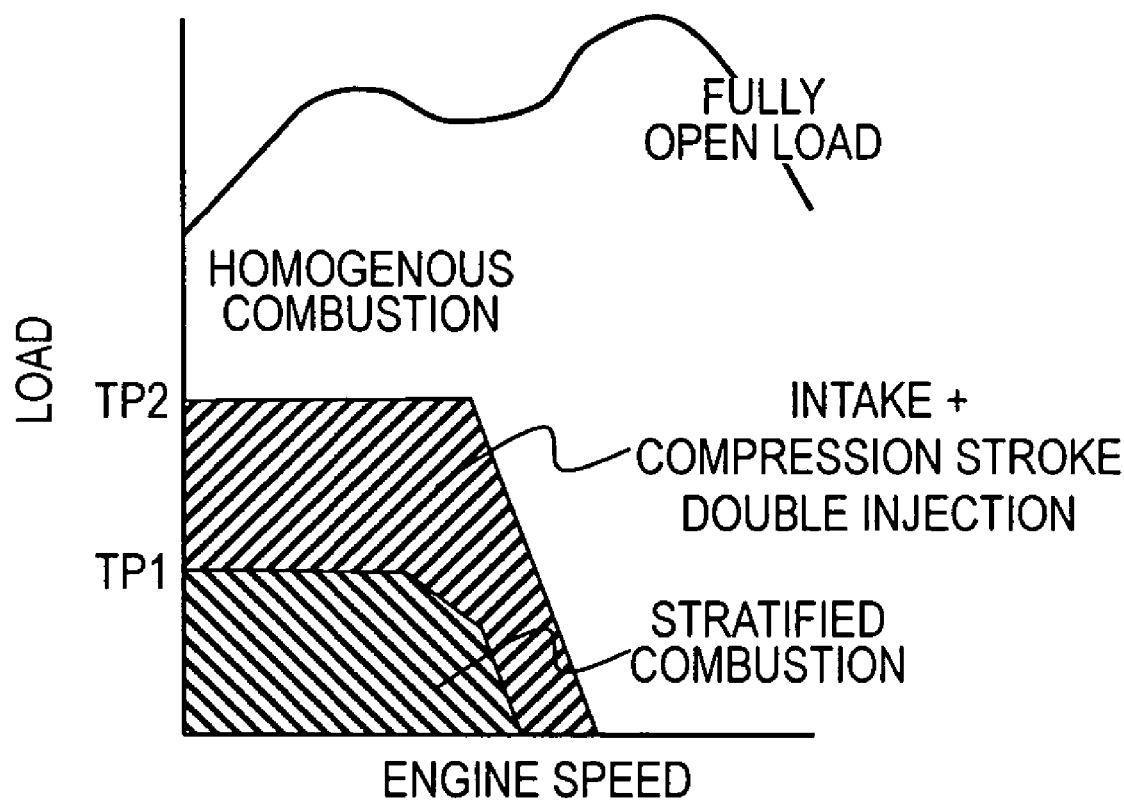
FIG. 3 is a combustion switching graph or map showing an example of setting the combustion switching regions for changing combustion mode based on predetermined regions defined by engine load and engine speed in accordance with the first embodiment of the present invention.

The processing proceeds to step S5 when the catalyst is not activated. In step S5, the combustion mode is selected according to the engine load TP using the control map of FIG. 3. The processing executed in step S5 constitutes an engine load determination section that is configured to determine an engine load of the direct fuel injection engine 1 based on prescribed load regions as seen in FIG. 3.

In the low-load region, specifically, when the engine load TP is less than a first predetermined threshold value TP 1, a stratified combustion mode with a compression stroke injection is selected. In particular, the air/fuel ratio is set to be slightly leaner (A/F =15 to 16) than stoichiometric in stratified combustion, and fuel is injected to form a rich air-fuel mixture in stratified fashion around the spark plug in a compression stroke injection. Thus, stratified combustion is performed. The ignition timing (basic ignition timing that is set based on the coolant temperature Tw) is also corrected towards lag at this time (stratified retarded combustion).

In the intermediate load region, specifically, when the engine load TP is at or above the first predetermined threshold value TP1 and less than a second predetermined threshold value TP2 that is greater than the first predetermined threshold value TP1, a double-injection combustion mode is selected in which an intake stroke injection and a compression stroke injection occurs in a single combustion cycle. The air/fuel ratio is set to be substantially stoichiometric in the double-injection combustion mode, with the fuel injection being divided into two separate injection with one occurring in the intake stroke injection and one occurring in the compression stroke injection such that a comparatively rich air-fuel mixture is formed around the spark plug, and a comparatively lean air-fuel mixture is formed in the periphery thereof. Thus, the double-injection combustion performs a weakly stratified combustion. The ignition timing is also corrected towards lag at this time (double injection retarded combustion).

In the high-load region, specifically, when the engine load TP is at or above the second threshold value TP2, homogenous combustion with an intake stroke injection is performed. The air/fuel ratio is set to be substantially stoichiometric in homogenous combustion, fuel is injected during the intake stroke, an air-fuel mixture that is homogenous throughout the combustion chamber is formed. Thus, homogenous combustion is performed. The ignition timing is also corrected towards lag at this time (homogenous retarded combustion).

The amount of correction towards lag in the ignition timing is different for each combustion mode, and decreases in the order as follows: the stratified combustion mode, the double-injection combustion mode, and the homogenous combustion mode. The amount of correction of the intake air quantity (throttle opening) is also different for each combustion mode, and decreases in the order as follows: the stratified combustion mode, the double-injection combustion mode, and the homogenous combustion mode.

The intake air quantity per unit of engine speed (Qa/Ne), for example, is used as the load TP. The ratio of the required air quantity with respect to the fully-open air quantity, the torque conversion value, the accelerator opening, the throttle opening, the fuel injection pulse width, and the like can also be used.

The first threshold value TP 1 and the second threshold value TP2 can be set according to the engine speed Ne, in which case switching between stratified combustion, double-injection combustion, and homogenous combustion is performed for each operating regions such as those set forth in FIG. 3.

The engine control unit 20 determines in step S6 whether the processing has performed the first selection after startup. If the first selection has been executed once, then the processing proceeds to step S7, and the control operation is performed according to the selected combustion mode. Then, the processing returns to step S4. After the first selection has been processed once, the processing proceeds to step S8, where the engine control unit 20 determines whether a switch request is present. Specifically, whether the selected combustion mode is different from the previously selected combustion mode.

When there is no switch request, the present combustion mode is continued, and the processing returns to step S4.

Switch damping control is performed when a switch request is present. Switch damping control operates by the pre-switch combustion mode, and gradually changes over time the values of the air quantity (throttle opening TVO), the air/fuel ratio A/F, and the ignition timing ADV (correction amounts thereof) that correspond to the pre-switch combustion mode to the values thereof that correspond to the post-switch combustion mode. When the air quantity (throttle opening TVO), air/fuel ratio A/F, and ignition timing ADV (correction amounts thereof) have reached the values corresponding to the post-switch combustion mode, the processing proceeds to step S10, and the system switches to the selected combustion mode. The processing then returns to step S4.

Figure 4:
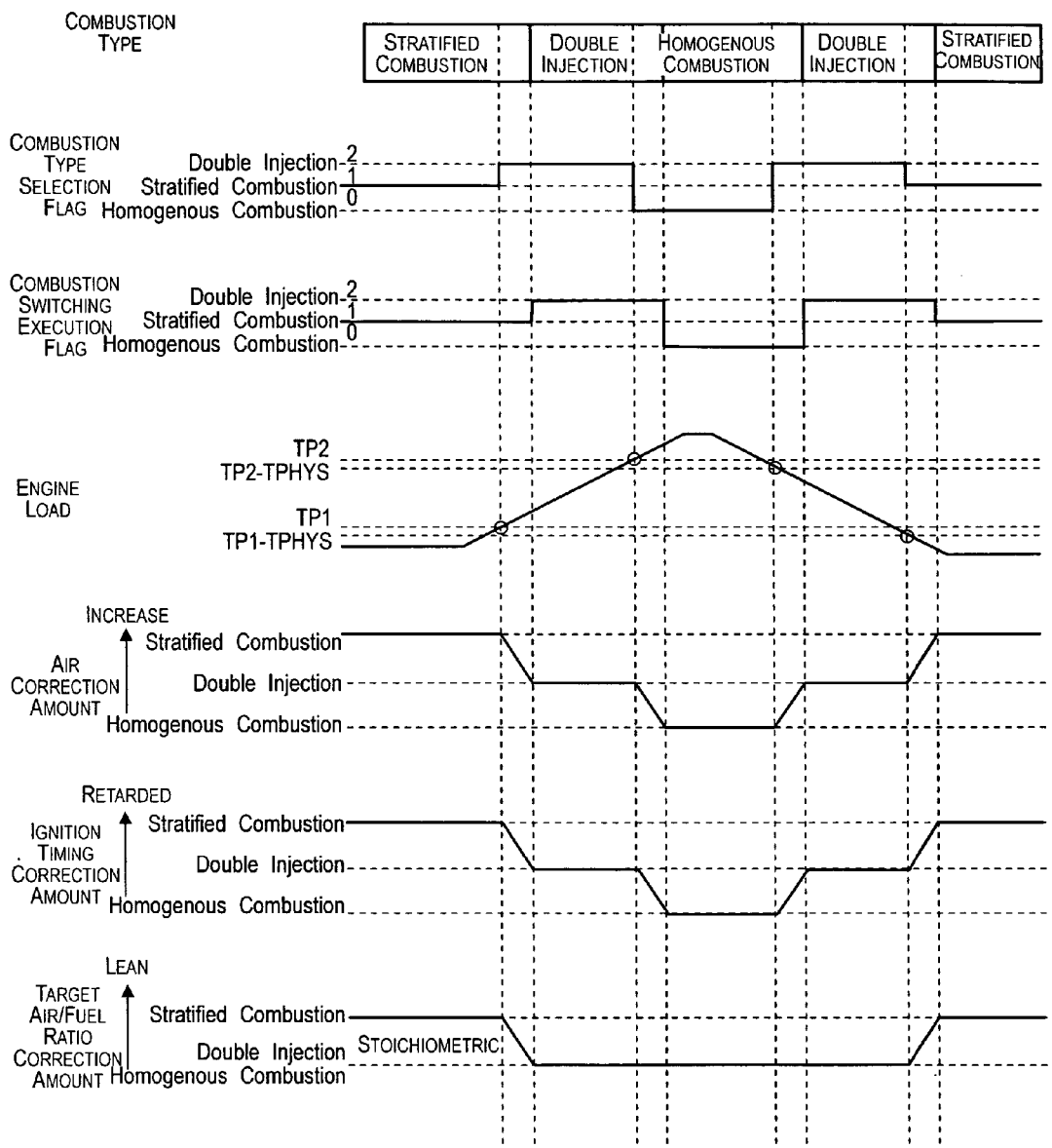
FIG. 4 is a timing chart used in controlling the combustion mode and for switching combustion mode in accordance with the first embodiment of the present invention.

The processing executed in steps S6 to S10 which uses the timing chart of FIG. 4 constitutes a combustion control section that is configured to control a combustion mode based on the engine load as determined by the engine load determination section (step S5-FIG. 3) and the state of the catalyst as determined by the catalyst condition determination section (step S4) such that a stratified combustion mode is performed when the engine load is a prescribed low load region and when warming up of the catalyst is required, and such that a double-injection combustion mode is performed with an intake stroke injection and a compression stroke injection when the engine load is higher load than the prescribed low load region. The combustion control section (steps S6 to S10) also is further configured to perform the double-injection combustion mode such when the engine load is a prescribed medium load, and perform a homogenous combustion mode with an intake stroke injection when the engine load is a prescribed high load.

When the catalyst of the catalytic converter 8 is activated by this type of control during warm-up, the processing proceeds from step S4 to step S11 and shifts to normal control.

A timing chart is shown in FIG. 4 in which the engine load changes in the order: low load→intermediate load→high load→intermediate load→high load. In the chart, selection of the combustion mode is indicated by the value of the "combustion mode selection flag," and actual switching of the combustion mode is indicated by the value of the "combustion switching execution flag." A value TPHYS is a hysteresis that is set for preventing hunting for the threshold values TP1 and TP2.

The effects of the present invention will next be described.

Stratified combustion in a cold state enhances combustion stability by concentrating a strong air-fuel mixture around the spark plug. There is also less fuel adhering to the walls of the combustion chamber, so the level of HC discharged from the engine can be lowered. A design can be adopted whereby the ignition timing can be retarded by an amount commensurate with the enhanced combustion stability, and an exhaust temperature increase for accelerating warm-up of the catalyst can be obtained. However, as the load increases, the periphery of the spark plug becomes too concentrated, and rebounding can occur whereby the combustion stability declines and smoke is discharged.

Because double-injection combustion in a cold state forms a comparatively rich fuel-air mixture around the spark plug and forms a comparatively lean air-fuel mixture at the periphery thereof, although HC reducing effects are inferior to stratified combustion from the perspective of adherence of fuel to the walls of the combustion chamber, these effects are superior to homogenous combustion. Fuel is also passed throughout the combustion chamber, so combustion can be stabilized up to a comparatively high load, and the exhaust temperature can be increased by retardation of the ignition timing.

Consequently, in the present invention, stratified combustion with a compression stroke injection is performed in a low-load region according to the engine load when warming up of the catalyst is required, whereby the amount of fuel adhering to the walls of the combustion chamber can be reduced, and the level of HC discharged from the engine can be reduced as well. The ignition timing can be retarded and the exhaust temperature increased by an amount commensurate with the enhanced combustion stability that can be obtained in a low-load region by concentrating a strong air-fuel mixture around the spark plug, whereby the catalyst can be activated.

When the load increases, the combustion stability can decline and smoke can be discharged due to too much concentration around the spark plug during stratified combustion, so when the load is high, activation of the catalyst can be obtained by adopting a design whereby the combustion stability can be enhanced and the ignition timing retarded while the HC-reducing effects are maintained by causing double-injection combustion to be performed by intake stroke injection and compression stroke injection.

Furthermore, when the load increases and a high load (near fully open) is established, the air-fuel mixture becomes excessively concentrated around the spark plug to cause HC to increase even during double-injection combustion, and a switch to homogenous combustion is made according to the output requirement. At this time as well, the ignition timing is retarded as much as possible and the exhaust temperature is raised, whereby the catalyst is activated.

Figure 5:
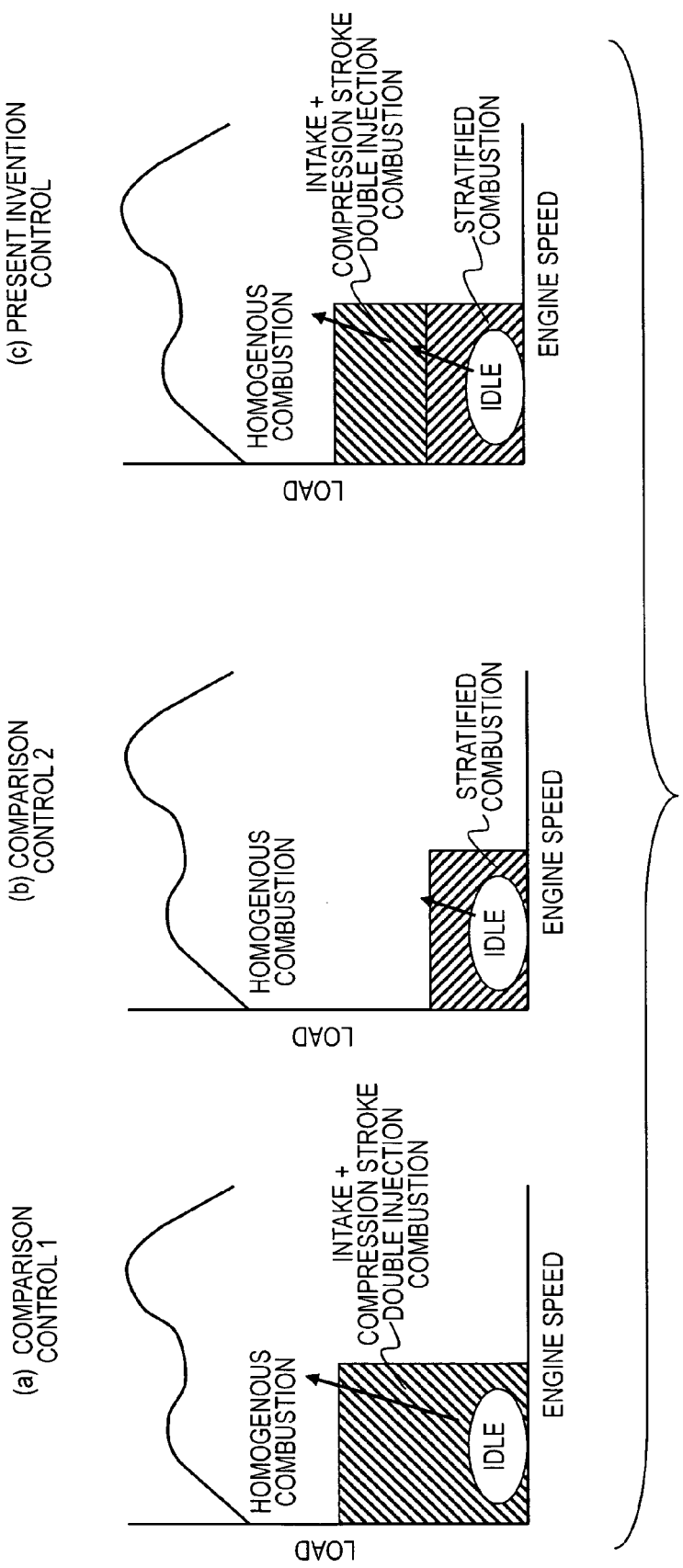
FIG. 5 is a simplified diagram of a combustion switching graph or map comparing two comparison controls 1 and 2 to the control of the present invention.

The control of the present invention will be compared herein with comparison control 1 and comparison control 2 depicted in FIG. 5.

In comparison control 1, the double injection combustion with an intake stroke injection and a compression stroke injection is performed during idling after a cold engine start, and the changeover to homogenous combustion is made when the load increases from this condition to a high load, as shown in map (a) of FIG. 5.

In comparison control 2, stratified combustion is performed during idling after a cold engine start, and the changeover to homogenous combustion is made when the load increases from this condition, as shown in map (b) of FIG. 5.

In contrast, in the control of the present invention, stratified combustion is performed at a low load, double injection combustion with an intake stroke injection and a compression stroke injection is performed at an intermediate load, and a switch is made to homogenous combustion at a high load, as shown in map (c) of FIG. 5.

Figure 6:
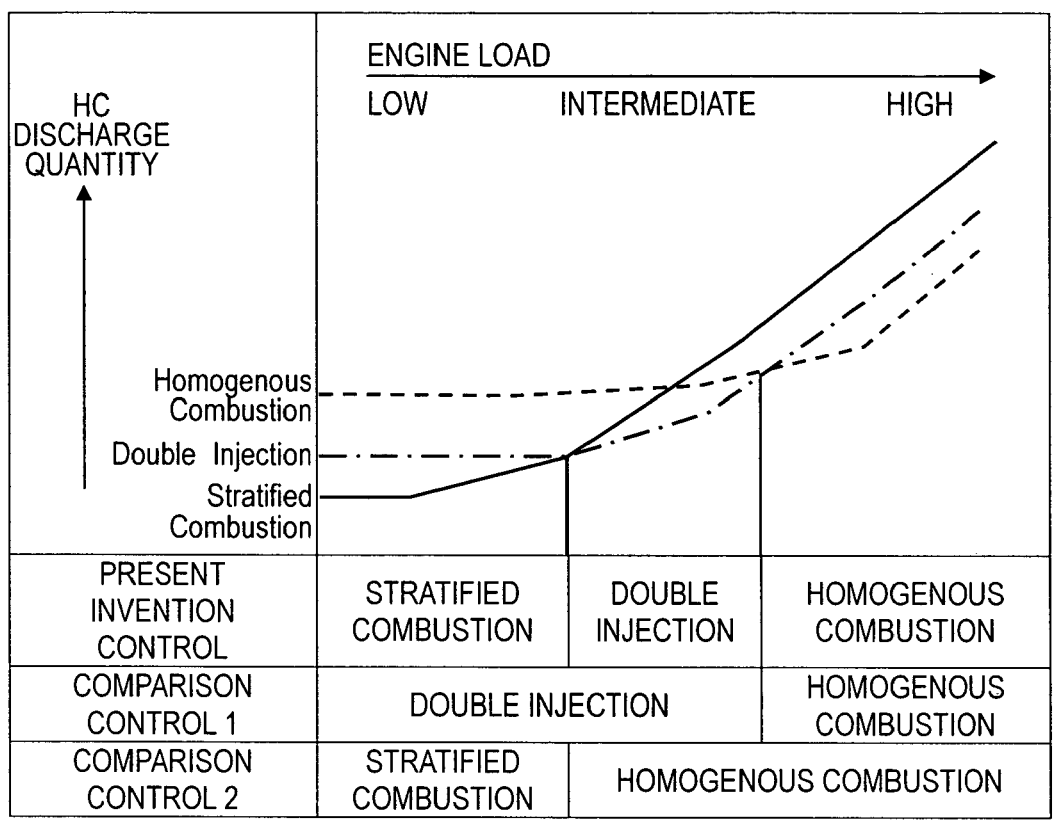
FIG. 6 is a diagram showing the characteristics of the HC discharge quantity with respect to the load when using the control of the present invention and when using the two comparison controls 1 and 2.

FIG. 6 shows the characteristics of the HC discharge quantity with respect to the load for stratified combustion, double-injection combustion, and homogenous combustion.

A selective switch to the combustion mode that always minimizes the HC discharge quantity can be made according to load conditions by switching to stratified combustion at low load, double-injection combustion at intermediate load, and homogenous combustion at high load with the control of the present invention, whereby HC can be reduced. Particularly, reduced HC is obtained at the low load condition in comparison with comparison control 1. Reduced HC is obtained at the intermediate load condition in comparison with comparison control 2.

Figure 7:
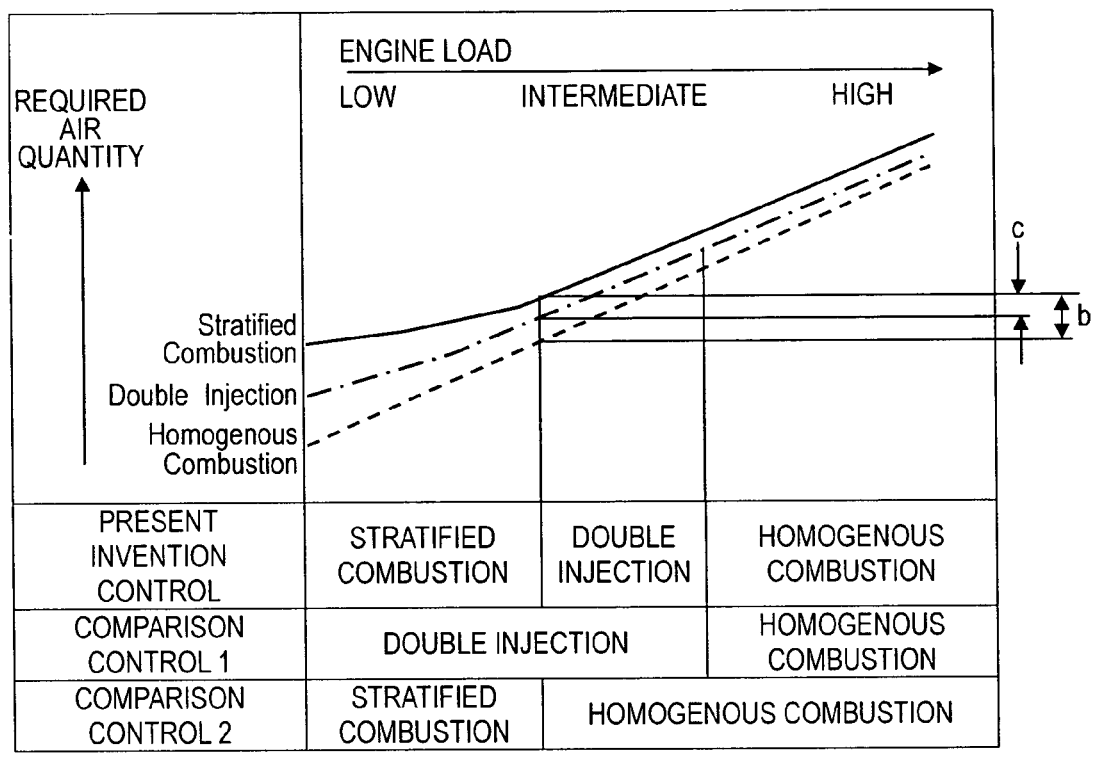
FIG. 7 is a diagram showing the characteristics of the required air quantity with respect to the load when using the control of the present invention and when using the two comparison controls 1 and 2.
Figure 8:
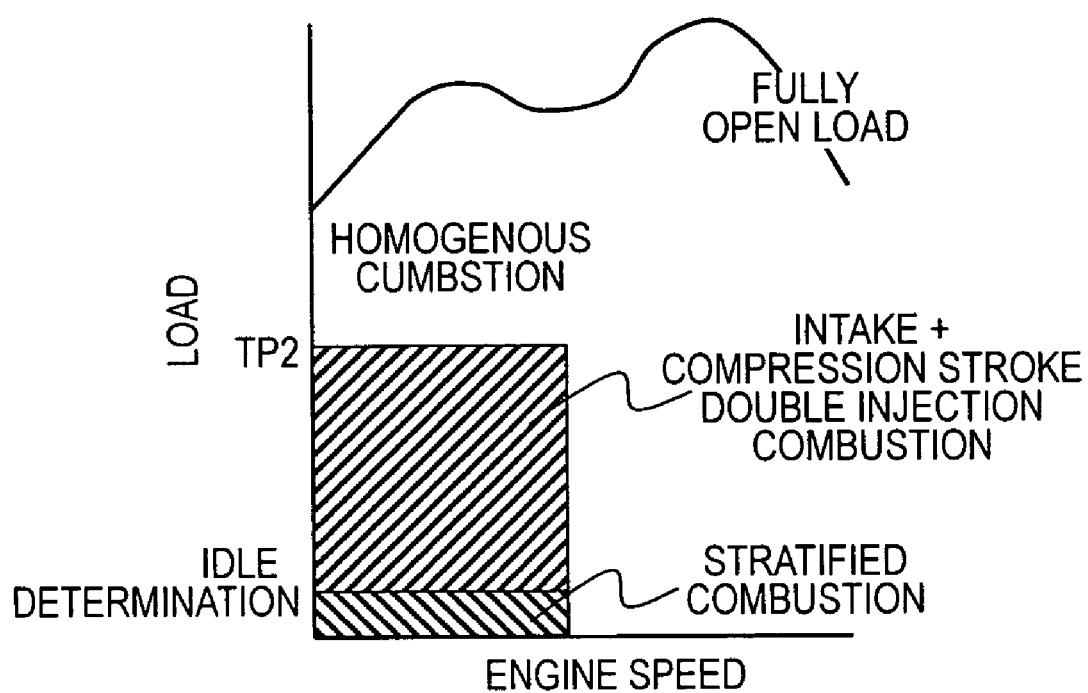
FIG. 8 is another combustion switching graph or map showing an example of setting the combustion switching regions for changing combustion mode based on predetermined regions defined by engine load and engine speed in accordance with the present invention

FIG. 7 shows the characteristics of the required air quantity with respect to the load for stratified combustion, double-injection combustion, and homogenous combustion.

By switching to stratified combustion at low load, double-injection combustion at intermediate load, and homogenous combustion at high load with the control of the present invention, the difference in the required air quantity during switching that is needed to generate the same torque can be reduced, and the torque steps can thus be reduced in size. Particularly, the difference in air quantity, as indicated by "b" in FIG. 7, occurs during switching from low load to intermediate load (during switching from stratified combustion to homogenous combustion) by comparison control 2. However, the air quantity difference changes (decreases), as indicated by "c" in FIG. 7, with the control of the present invention. Thus, the air quantity is significantly reduced with the control of the present invention.

As described above, a continuous changeover from stratified combustion to double-injection combustion to homogenous combustion can be performed according to engine load with no torque step while improving emissions (HC).

The threshold value of the load at which the combustion mode is switched is changed according to the engine speed, whereby the region in which stratified combustion or double-injection combustion is performed can be enlarged at the higher speeds, switching can be performed at any speed without a torque step occurring, and the catalyst can be warmed more rapidly.

A configuration can also be adopted whereby the threshold value at which the combustion mode is switched (particularly the second threshold value TP2 at which double-injection combustion and homogenous combustion are switched) is varied according to the coolant temperature Tw, the value is reduced with higher coolant temperature Tw, and a switch to homogenous combustion is made at a lower load.

The low-load region for performing stratified combustion can also be set to include only the idle operation region in order to reduce the complexity of combustion switching.

The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-357751. The entire disclosure of Japanese Patent Application No. 2003-357751 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A direct fuel injection/spark ignition engine control device comprising:
an engine load determination section configured to determine an engine load of a direct fuel injection engine;
a catalyst condition determination section configured to determine a state of a catalyst for exhaust purification disposed in an exhaust passage of the direct fuel injection engine; and
a combustion control section configured to control a combustion mode based on the engine load as determined by the engine load determination section and the state of the catalyst as determined by the catalyst condition determination section such that a stratified combustion mode with a compression stroke injection is performed when the engine load is a prescribed low load region and when warming up of the catalyst is required, and a double-injection combustion mode is performed with an intake stroke injection and a compression stroke injection when the engine load is higher load than the prescribed low load region and when warming up of the catalyst is required,
the combustion control section being further configured to control an ignition timing by setting an ignition timing correction amount to retard the ignition timing for both the stratified combustion mode and the double-injection combustion mode such that the ignition timing correction amount for the stratified combustion mode is larger than the ignition timing correction amount for the double-injection combustion mode.

2. The direct fuel injection/spark ignition engine control device according to claim 1, wherein
the combustion control section is further configured to set an air/fuel ratio during the stratified combustion mode to be more lean than stoichiometric, and the air/fuel ratio during the double-injection combustion mode to be substantially stoichiometric.

3. The direct fuel injection/spark ignition engine control device according to claim 1, wherein
the combustion control section is further configured to switch the combustion mode such that a threshold value of the engine load at which the combustion mode is switched is changed according to engine speed.

4. The direct fuel injection/spark ignition engine control device according to claim 1, wherein
the combustion control section is further configured to perform the stratified combustion mode such that the prescribed low load region for performing the stratified combustion mode comprises an idle operation region.

5. The A direct fuel injection/spark ignition engine control device comprising:
an engine load determination section configured to determine an engine load of a direct fuel injection engine;
a catalyst condition determination section configured to determine a state of a catalyst for exhaust purification disposed in an exhaust passage of the direct fuel injection engine; and
a combustion control section configured to control a combustion mode based on the engine load as determined by the engine load determination section and the state of the catalyst as determined by the catalyst condition determination section such that a stratified combustion mode with a compression stroke injection is performed when the engine load is a prescribed low load region and when warming up of the catalyst is required, and a double-injection combustion mode is performed with an intake stroke injection and a compression stroke injection when the engine load is higher load than the prescribed low load region and when warming up of the catalyst is required,
the combustion control section being further configured to control an intake air quantity by setting an intake air quantity correction amount for both the stratified combustion mode and the double-injection combustion mode such that the intake air quantity correction amount is increased larger during the stratified combustion mode than during the double-injection combustion mode.

6. A direct fuel injection/spark ignition engine control device comprising:

an engine load determination section configured to determine an engine load of a direct fuel injection engine;
a catalyst condition determination section configured to determine a state of a catalyst for exhaust purification disposed in an exhaust passage of the direct fuel injection engine; and
a combustion control section configured to control a combustion mode based on the engine load as determined by the engine load determination section and the state of the catalyst as determined by the catalyst condition determination section such that a stratified combustion mode with a compression stroke injection is performed when the engine load is a prescribed low load region and when warming up of the catalyst is required, and a double-injection combustion mode is performed with an intake stroke injection and a compression stroke injection when the engine load is higher load than the prescribed low load region and when warming up of the catalyst is required,
the combustion control section being further configured to perform the double-injection combustion mode when the engine load is a prescribed medium load, and perform a homogenous combustion mode with an intake stroke injection when the engine load is a prescribed high load.

7. The direct fuel injection/spark ignition engine control device according to claim 6, wherein
the combustion control section is further configured to control an air/fuel ratio during the stratified combustion mode to be more lean than stoichiometric, and the air/fuel ratio during the double-injection combustion mode and the homogenous combustion mode to be substantially stoichiometric.

8. The direct fuel injection/spark ignition engine control device according to claim 7, wherein
the combustion control section is further configured to control an ignition timing such that an ignition timing correction amount to retard the ignition timing is set for each of the stratified combustion mode and the double-injection combustion mode.

9. The direct fuel injection/spark ignition engine control device according to claim 8, wherein
the combustion control section is further configured to control the ignition timing such that the ignition timing correction amount decreases in order as follows: the stratified combustion mode, the double-injection combustion mode, and then the homogenous combustion mode.

10. The direct fuel injection/spark ignition engine control device according to claim 9, wherein
the combustion control section is further configured to control an intake air quantity such that an intake air quantity correction amount is set for each of the stratified combustion mode, the double-injection combustion mode and the homogenous combustion mode.

11. The direct fuel injection/spark ignition engine control device according to claim 10, wherein
the combustion control section is further configured to control the intake air quantity such that the intake air quantity correction amount decreases in order as follows: the stratified combustion mode, the double-injection combustion mode, and then the homogenous combustion mode.

12. The direct fuel injection/spark ignition engine control device according to claim 6, wherein
the combustion control section is further configured to control an ignition timing such that an ignition timing correction amount to retard the ignition timing is set for each of the stratified combustion mode and the double-injection combustion mode.

13. The direct fuel injection/spark ignition engine control device according to claim 12, wherein
the combustion control section is further configured to control the ignition timing such that the ignition timing correction amount decreases in order as follows: the stratified combustion mode, the double-injection combustion mode, and then the homogenous combustion mode.

14. The direct fuel injection/spark ignition engine control device according to claim 12, wherein
the combustion control section is further configured to control an intake air quantity such that an intake air quantity correction amount is set for each of the stratified combustion mode, the double-injection combustion mode and the homogenous combustion mode.

15. The direct fuel injection/spark ignition engine control device according to claim 14, wherein
the combustion control section is further configured to control the intake air quantity such that the intake air quantity correction amount decreases in order as follows: the stratified combustion mode, the double-injection combustion mode, and then the homogenous combustion mode.

16. A direct fuel injection/spark ignition engine control device comprising:
engine load determination means for determining an engine load of a direct fuel injection engine;
catalyst condition determination means for determining a state of a catalyst for exhaust purification disposed in an exhaust passage of the direct fuel injection engine; and
combustion control means for controlling a combustion mode based on the engine load and the state of the catalyst such that a stratified combustion mode with a compression stroke injection is performed when the engine load is a prescribed low load region and when warming up of the catalyst is required, and a double-injection combustion mode is performed with an intake stroke injection and a compression stroke injection when the engine load is higher load than the prescribed low load region and when warming up of the catalyst is required
the combustion control means further including a function for controlling an ignition timing by setting an ignition timing correction amount to retard the ignition timing for both the stratified combustion mode and the double-injection combustion mode such that the ignition timing correction amount for the stratified combustion mode is larger than the ignition timing correction amount for the double-injection combustion mode.

17. A direct fuel injection/spark ignition engine control device comprising:
determining an engine load of a direct fuel injection engine;
determining a state of a catalyst for exhaust purification disposed in an exhaust passage of the direct fuel injection engine; and
controlling a combustion mode based on the engine load and the state of the catalyst such that a stratified combustion mode with a compression stroke injection is performed when the engine load is a prescribed low load region and when warming up of the catalyst is required, and a double-injection combustion mode is performed with an intake stroke injection and a compression stroke injection when the engine load is higher load than the prescribed low load region and when warming up of the catalyst is required controlling an ignition timing by setting an ignition timing correction amount to retard the ignition timing for both the stratified combustion mode and the double-injection combustion mode such that the ignition timing correction amount for the stratified combustion mode is larger than the ignition timing correction amount for the double-injection combustion mode.

* * * * *